United States Patent [19]
Haneda

[11] Patent Number: 4,498,144
[45] Date of Patent: Feb. 5, 1985

[54] ELECTRONIC APPARATUS WITH A DISPLAY AND PRINTER
[75] Inventor: Isamu Haneda, Nara, Japan
[73] Assignee: Sharp Kabushiki Kaisha, Osaka, Japan
[21] Appl. No.: 323,049
[22] Filed: Nov. 19, 1981
[30] Foreign Application Priority Data
Nov. 19, 1980 [JP] Japan .................... 55-163759
[51] Int. Cl.$^3$ ................................. G06F 9/00
[52] U.S. Cl. ..................................... 364/900
[58] Field of Search ... 364/200 MS File, 900 MS File
[56] References Cited
U.S. PATENT DOCUMENTS
3,859,635  1/1975  Watson et al. .................. 364/200
4,138,719  2/1979  Swanstrom et al. ............. 364/200

OTHER PUBLICATIONS
Katzan, The IBM 5100 Portable Computer, 1977, pp. 174–182.

Primary Examiner—Gareth D. Shaw
Assistant Examiner—John G. Mills
Attorney, Agent, or Firm—Birch, Stewart, Kolasch & Birch

[57] ABSTRACT

There is disclosed an electronic apparatus which includes a visual display and a printer, the apparatus including a display control for dividing the information to be displayed into a plurality of shorter segments and a printer control for enabling the printer to print each segment of the information on a single line, thus eliminating the need to change lines during the course of printing of the information.

4 Claims, 6 Drawing Figures

| PRINT MODE | TYPE | EXAMPLE | TYPE | EXAMPLE |
|---|---|---|---|---|
| (1) | DIS 1 | | PR 1 | 3.1415926154 |
| | DIS 1 | 123456789.000000000 | PR 2 | 123456789.000000000 |
| (2) | DIS 2 | MUSIC | PR 3 | MUSIC |
| | DIS 3 | −0.5 | PR 4 | −0.15 |
| | DIS 4 | MT.FUJII= 123456E−08 | PR 4 | 123456E−08 |
| | DIS 5 | 37776=MT.FUJII | PR 4 | 37776 |
| | DIS 6 | AS= MT.FUJII | PR 4 | =MT.FUJII |
| | | | PR 4 | AS= MT.FUJII |
| (3) | DIS 7 | MT.FUJII= 37776 METER | PR 5 | MT.FUJII= 37776 ME TER |
| | DIS 7 | ABCDEFGHIJKLMNOPQRSTUVWX | PR 5 | ABCDEFGHIJKLMNOP QRSTUVWXYZ012345 6789 |

FIG. 4

ELECTRONIC APPARATUS WITH A DISPLAY AND PRINTER

BACKGROUND OF THE INVENTION

This invention relates to an electronic apparatus such as a programmable hand-held calculator and a personal computer equipped with a visual display and a printer as its output devices.

For programmable hand-held calculators and personal computers, it is desirable that information appearing on a visual display panel be capable of being printed by means of a printer which is straightforward when the printer is of the same capacity of characters per line as that of the display panel. However, in the case where the printer has a smaller capacity of characters than that of the display panel, it is impossible for the printer to print the same information in the same format as the display panel does. Therefore, when information on the display panel is to be printed starting with the leading character thereof, the print-out must extend onto at least two different lines with the resultant difficulty in recognition thereof. A software-aided measure to avoid this problem, however, causes uneconomical use of the display panel per line and a low degree of clarity in both the display and the print-out.

OBJECTS AND SUMMARY OF THE INVENTION

Accordingly, it is an object of the present invention to provide an improved electronic apparatus equipped with a display and a printer which assures a higher degree of clarity when the printer is of a less capacity than that of the display.

It is another object of the present invention to provide an electronic apparatus having a display and a printer which includes means for dividing information to be displayed and printed into a plurality of segments and means for enabling the printer to print each segment of the information on a single line thus eliminating the need to change lines during the course of printing each segment of the information.

To achieve the above mentioned objects, the present invention provides an electronic apparatus which includes a visual display and a printer as its output devices with the printer being of a character capacity per line less than that of the visual display, means for dividing the character information to be displayed into a plurality of segments according to their nature and means for enabling the printer to print each such segment of the information on a single line thus eliminating the need to change lines during the course of printing of the information.

BRIEF DESCRIPTION OF THE DRAWINGS

The present invention will be better understood from the detailed description given hereinbelow and the accompanying drawing which is given by way of illustration only, and thus is not limitative of the present invention and wherein:

FIG. 4 is a view illustrating an example of the information as displayed and printed by an apparatus according to the invention;

DETAILED DESCRIPTION OF THE INVENTION

In the following description, there is illustrated a programmable hand-held calculator having as its dual output devices, a visual display panel having a 24-digit or character per line capacity and a printer having a 16-digit per line capacity. When being displayed, the information is divided into an upper 16-digit segment and a lower 16-digit segment. For printing of information, the upper 16-digit segment is printed on an upper line and the lower 16-digit segment is printed on a lower line as will be described more fully hereinbelow.

Figure 1:
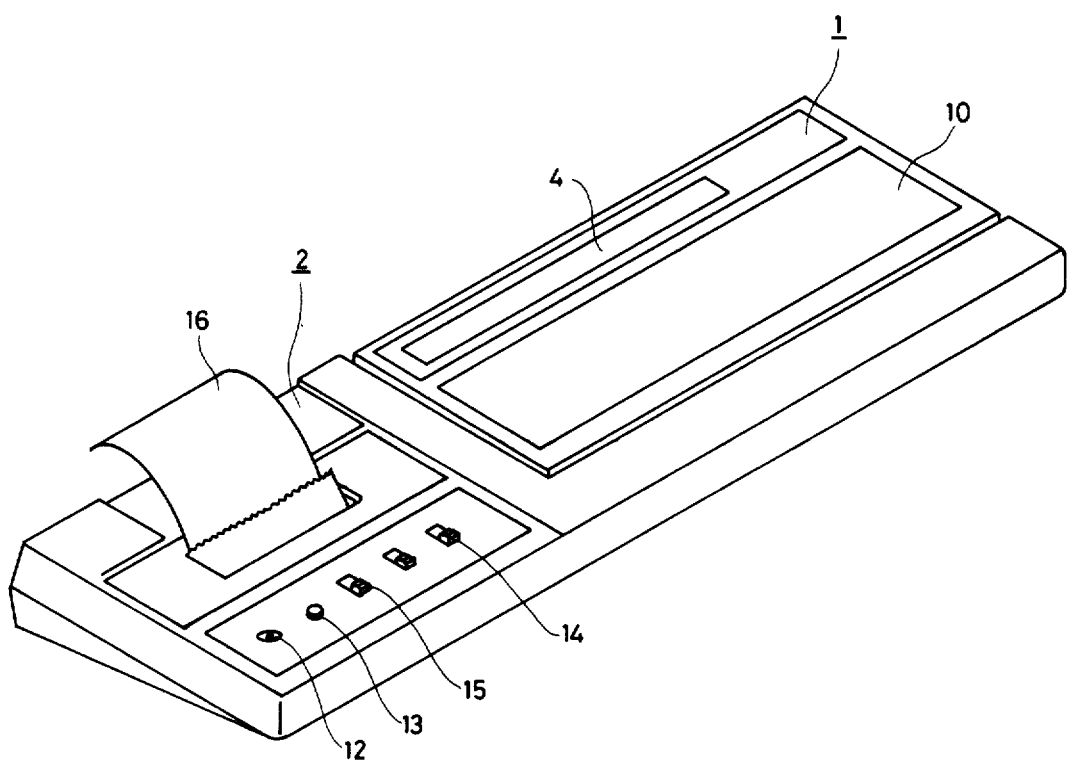
FIG. 1 is a perspective view of the appearance of a programmable hand-held calculator constructed in accordance with a preferred embodiment of the present invention.

Turning now to the drawing, FIG. 1 is a perspective view showing the appearance of a preferred embodiment of the present invention, which embodiment includes a calculator main body 1, a visual display panel 4, a keyboard 10, a printer 2, a power switch 14 for the printer 2, a LED (a light emitting diode) 12 for warning of a voltage drop of a battery or batteries contained within the printer 2, a paper advance button 13 for advancing a printing journal 16 and a stop switch 15 operating as described below when only the display panel 4 is in use in the main body 1 or when the printer 2 is disabled. It is noted that the main body 1 is connected to the printer 2 by way of a conventional connector assembly although not shown.

Figure 2:
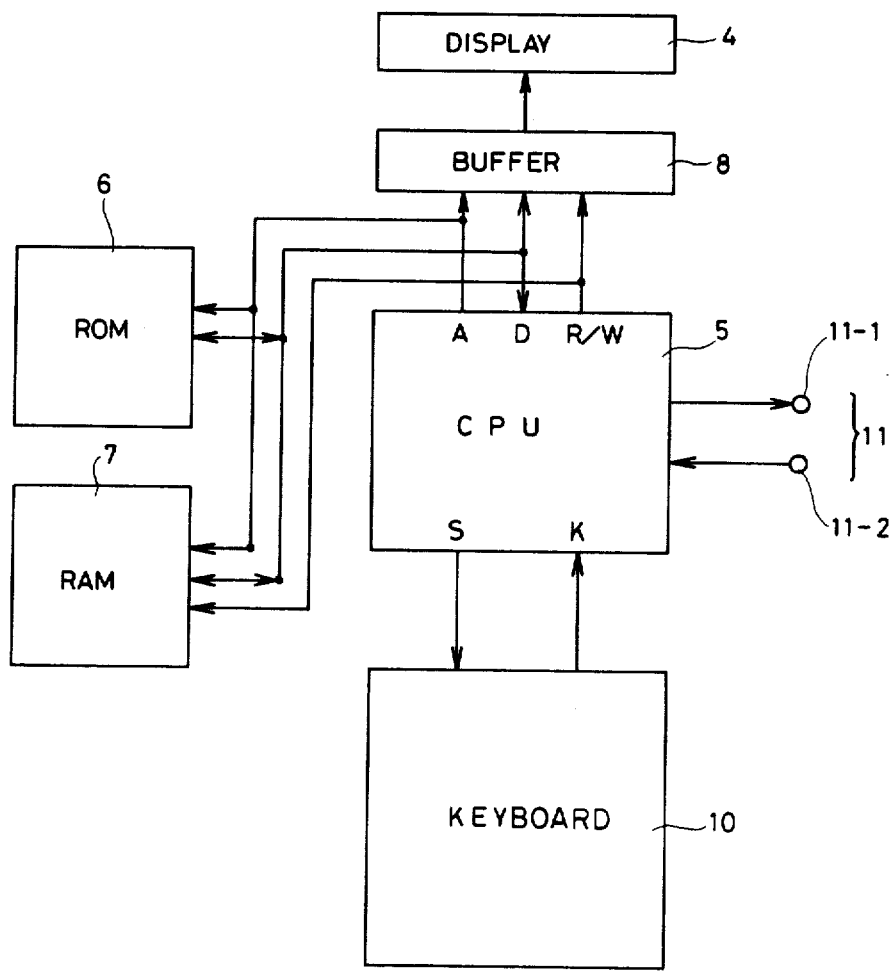
FIG. 2 is a block diagram of a calculator body 1 in the illustrated embodiment.

FIG. 2 is a block diagram showing a preferred circuit as housed in the calculator main body 1, wherein a central processing unit (CPU) 5 is incorporated to execute decoding of keyed inputs, displaying, printing, program editing and interpreting a program language, pursuant to the contents of a read only memory (ROM) 6. As is well known in the art, the ROM 6 stores programs for governing operation of the CPU 5. A random access memory (RAM) 7 stores programs and data as well as storing flags and keyed inputs necessary for execution of the programs. A display memory and buffer 8 holds information to be displayed and converted into the visual display panel 4 which has 24 character positions per line in the given example. The keyboard 10 is of a matrix arrangement supplied with key strobe signals S from the CPU 5 and key signals K to the CPU 5 and includes a plurality of alphanumerical keys and symbol keys. Connection terminals 11 (11-1, 11-2) are provided for connection with the printer 2 and the CPU has an address bus A, a data bus D and a lead line R/W for a read/write signal.

An example of the program language is BASIC. An instruction statement for displaying or printing information as specified by the program is PRINT. Whether printing or displaying of the information by the PRINT statement occurs depends upon whether the printer 2 is operatively connected. In other words, printing is effected when the printer 2 is connected and electrically activated through the switch 15.

Whether the printer 2 is connected is decided by whether a particular one of the connection terminals 11-2 leading to the printer 2 of FIG. 2 is at a "H" level or a "L" level. In other words, a terminal of the printer 2 connected to that terminal is constantly supplied with a "H" level, for example.

In the illustrated embodiment, displaying or printing as instructed by the PRINT statement is carried out in any one of the following three modes.

(1) PRINT ($X_1$)
(2) PRINT ($X_1$), ($X_2$)
(3) PRINT ($X_1$), ($X_2$), . . . ($X_n$)

In the mode (1) where the information consists, see FIG. 4, of characters of a single type, numeric or all others, displaying or printing is performed against the right margin in the case where the contents of ($X_1$) bear exclusively numeric data and displaying or printing is performed against the left margin in the case where the contents of ($X_1$) bear exclusively other character data.

In the mode (2), the visual display panel is divided into an upper 12 character positions and lower 12 character positions, the former displaying the contents of ($X_1$) and the latter displaying the contents of ($X_2$). Printing, on the other hand, is effected such that the contents of ($X_1$) appear on the upper row and the contents of ($X_2$) on the lower row. When the contents of ($X_1$) and ($X_2$) both contain numeric data, displaying or printing against the right margin is effected within the 12 character positions in the upper and lower rows. If the contents of either of the portions includes other or non-numeric character data, then printing or displaying against the left margin is effected within the 12 character places in the upper and lower rows.

The mode (3) is conducted such that the contents of ($X_1$), ($X_2$) . . . ($X_n$) are sequentially displayed or printed abutting the left margin beginning with the most significant character position.

In the case where the contents exceed 24 characters during the mode (1) and mode (3) of display, only the first 24 digits of the contents are displayed. Though numeric data may be displayed or printed within the 24 character positions, the numeric data exceeding 16 characters is printed beginning with the most significant digit abutting the left margin accompanied by a return of the succeeding line to the left margin. The numeric data is compressed into 12 characters through the mode (2) (conversion into exponential representation) and the other character data is displayed or printed in terms of only the upper 12 characters thereof.

Figure 3:
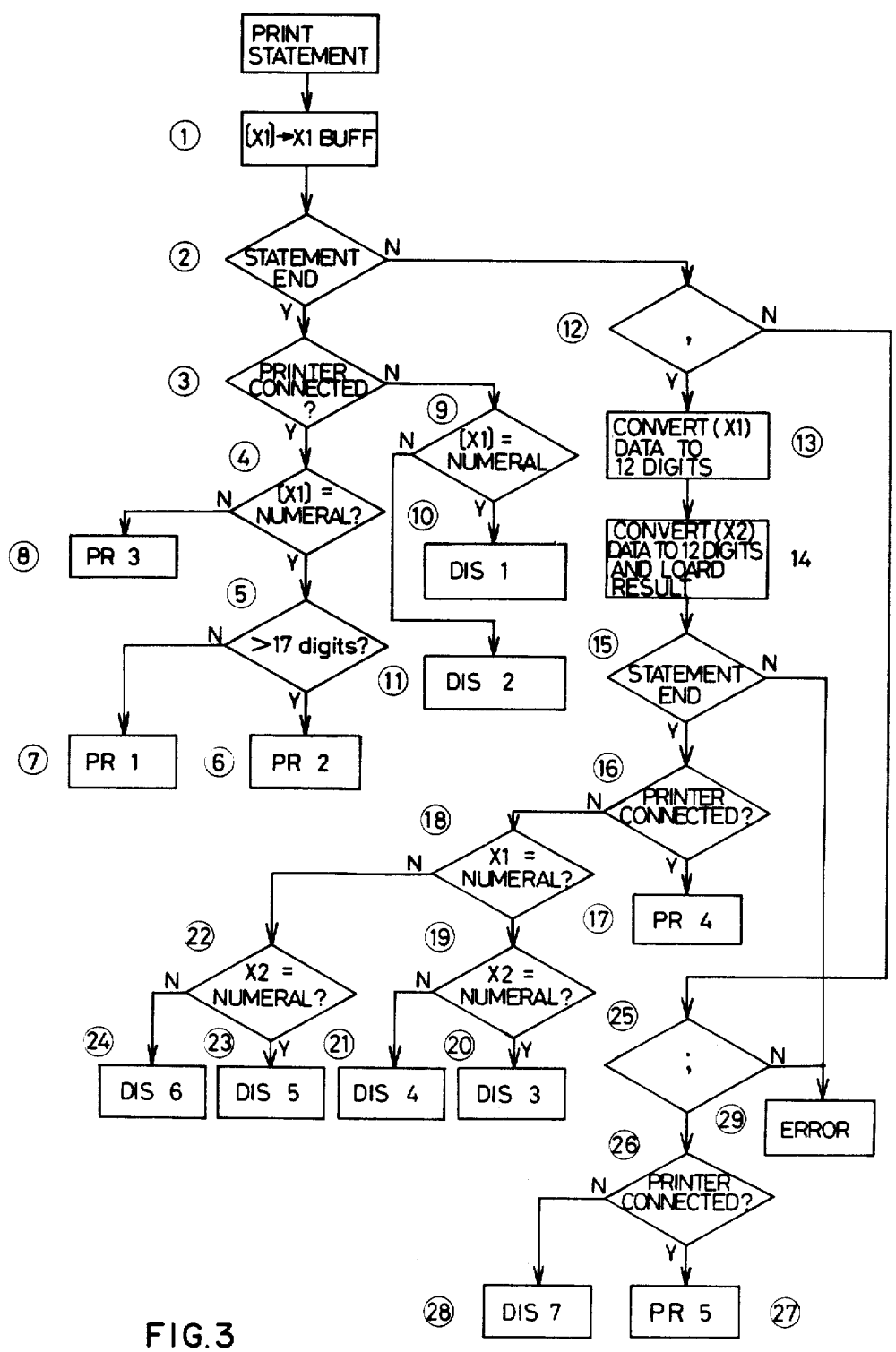
FIG. 3 is a flow chart for explaining a PRINT statement in the illustrated embodiment.

FIG. 3 is a flow chart showing execution of the PRINT statement. In this flow chart, the buffers $X_1$ and $X_2$ are ones which temporarily store a first operand ($X_1$) and a second operand ($X_2$) in the PRINT statement. Both the operands are held in a desired region of the RAM 7 of FIG. 2. The following is a listing of steps executed in the flow chart.

(1) Load the $X_1$ buffer with the contents ($X_1$) as specified by the PRINT statement. When this occurs, such operations as arithmetic operations are carried out if necessary.

(2) Decide what type of the PRINT statement is selected. To this end it is decided whether PRINT ($X_1$) is present in the mode (1). In other words, if the step following ($X_1$) is at the end of the statement (an ENTER code, a line end, a colon code or one or more boundaries in multistatements), the mode (1) is judged as effective.

(3) Decide if the printer is connected.

(4) Decide if the contents of ($X_1$) are numeric data.

(5) Decide whether the number of characters to be printed is within 17 digits when ($X_1$) contains only numeric data.

(6) Print the data with the most significant character when it exceeds 17 characters (print 2).

(7) Print against the right margin when it is less than 17 digits (print 1)

(8) Print with the most significant character abutting the left margin when the contents of ($X_1$) are not numeric data (print 3).

(9) Effect visual display when the printer is not connected. To this end the contents of ($X_1$) are monitored.

(10) Display against the right margin when ($X_1$) contains numeric data.

(11) Display beginning with the most significant character abutting the left margin when ($X_1$) contains other character data.

(12) Because the format of the PRINT statement is not mode (1), it is next decided whether the mode (2) is in effect. To this end, a decision is made as to whether the code which follows ($X_1$) is ",".

(3) Because the format of the PRINT statement is mode (2), convert the contents of the $X_1$ buffer into 12 character long data portion and load the result into the $X_1$ buffer.

(14) Convert the contents of ($X_2$) into 12-character long data portion and load the result into the $X_2$ buffer.

(15) Make sure that the code after ($X_2$) shows the end of the statement. Otherwise, proceed with step (29).

(16) Decide if the printer is connected.

(17) Print the contents of the $X_1$ buffer on the upper row and print the contents of the $X_2$ buffer when the printer is connected.

(18) Display is demanded because of the printer being not connected. First of all, it is decided whether the contents of the $X_1$ buffer contains numeric data.

(19) Sense the contents of the $X_2$ buffer (as in step (22)). As a result, there are four routes available, based upon the contents of ($X_1$) and ($X_2$): (numeric), (numeric) (display 3); (numeric), (character), (display 4); (character), (numeric), (display 5); and (character), (character), (display 6). cf. steps (20), (21), (23) and (24), respectively.

(25) To decide whether the format of the PRINT statement is the remaining mode (3), decide if ";" follows ($X_1$). In the absence of ";", proceed with error step (29).

(26) Decide if the printer is connected.

(27) Print the contents of ($X_1$), ($X_2$) . . . ($X_n$) sequentially, beginning with the most significant digit abutting against the left margin. (print 5).

(28) Display instead of printing in step (27). (display 7).

Although the flow chart of FIG. 3 does not show steps following the desired steps as described above, those steps are actually carried out for execution of the next statement.

An example of the display steps 1–7 and the print steps 1–5 is illustrated in FIG. 4. In the second example of the display step 7, the data exceeds 24 characters but only the first 24 characters thereof are displayed. On the other hand, the contents are all printed (print 5).

It is clear from the foregoing that the contents displayed or printed are made easily understandable through the use of the PRINT statement of the mode (2).

Figure 5:
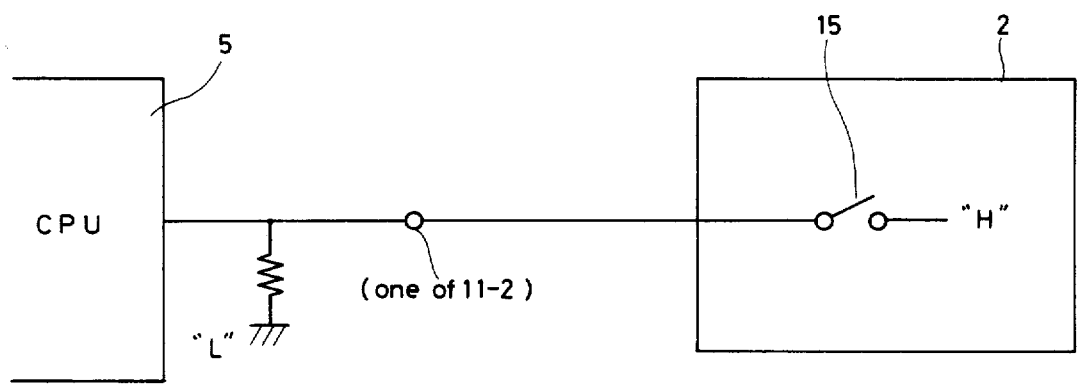
FIG. 5 is a view useful for explaining the operation of a switch 15 provided by a printer 2 in the illustrated embodiment.
Figure 6:
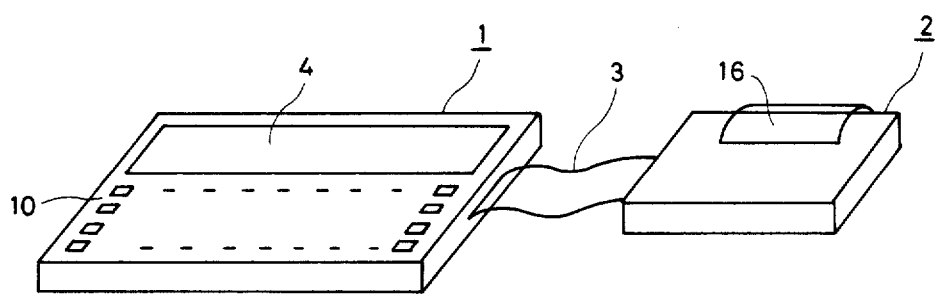
FIG. 6 is a perspective view of another embodiment of the present invention.

FIG. 5 depicts in more detail the switch 15 as shown in FIG. 1. In other words, this is a switch which changes the voltage level of a desired one of the connection terminals 11-2 leading to the printer 2 to a "L" level. Even when the printer 2 is connected, the same state is expected as in the case of the printer 2 not connected to the apparatus, thanks to operation of the switch 15. As seen from FIG. 6, the calculator body 1 and the printer 2 may be connected via a cable 3.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An improved electronic apparatus of the type having a visual display and a printer as output devices, the printer having a smaller capacity of characters per line than does the visual display, wherein the improvement comprises:
   means for reviewing a group of characters presented for visual display and assigning the group of characters to an appropriate one of three modes, characters within the group of characters being of two types, numeric and all others, the three modes being defined as:
   (1) all characters in the group of characters being of the same type;
   (2) characters in the group of characters being of at least one of the two types, of a total number equal to or less than the capacity of the visual display, and being divisible into two successive portions each containing only characters of a single type and of a number equal to or less than one-half of the capacity of the visual display; and
   (3) any other group of characters wherein the characters are of the two types;
   means responsive to the means for reviewing for causing a group of characters assigned to mode (1) to be printed with the numeric characters abutting against a first margin of the printer and with the other characters abutting against a second, opposing margin of the printer;
   means responsive to the means for reviewing for causing a group of characters assigned to mode (2) to be separated into these two portions with each of the two portions being printed on separate lines and with each portion that consists of numeric characters being printed abutting against the first margin of the printer and each portion containing other characters being printed abutted against the second margin of the printer; and
   means responsive to the means for reviewing for causing a group of characters assigned to mode (3) to be printed continuously from the left margin of the printer for as many sequential lines as are necessary to complete printing of the group of characters.

2. An improved electronic apparatus according to claim 1, wherein means are further provided for selecting whether the information is visually displayed or printed.

3. An improved electronic apparatus according to claim 1, wherein the first margin is the right and the second, opposing margin is the left.

4. An improved electronic apparatus according to claim 1, wherein the visual display has a capacity of 24 characters per line and the printer has a capacity of 16 characters per line.

* * * * *